United States Patent
Schiffmann

(10) Patent No.: US 7,501,168 B2
(45) Date of Patent: Mar. 10, 2009

(54) MULTILAYER PLANAR OR TUBULAR FOOD CASING OR FILM

(75) Inventor: Jurgen Schiffmann, Hennef-Rott (DE)

(73) Assignee: Kuhne Anlagenbau GmbH, Sankt Augustin (DE)

( * ) Notice: Subject to any disclaimer, the term of this patent is extended or adjusted under 35 U.S.C. 154(b) by 565 days.

(21) Appl. No.: 10/534,862

(22) PCT Filed: Jun. 6, 2003

(86) PCT No.: PCT/EP03/05984

§ 371 (c)(1),
(2), (4) Date: May 18, 2005

(87) PCT Pub. No.: WO2004/045852

PCT Pub. Date: Jun. 3, 2004

(65) Prior Publication Data

US 2006/0029821 A1    Feb. 9, 2006

(30) Foreign Application Priority Data

Nov. 20, 2002  (DE) ................. 102 54 172

(51) Int. Cl.
*A22C 13/00* (2006.01)
*B29D 22/00* (2006.01)
*B29D 23/00* (2006.01)

(52) U.S. Cl. .................. 428/34.8; 428/36.7; 428/36.91; 428/474.4; 428/475.5; 428/475.8

(58) Field of Classification Search .............. 428/474.4, 428/475.5, 475.8, 35.7, 36.61, 36.7, 36.9, 428/36.91, 34.9, 34.8

See application file for complete search history.

(56) References Cited

U.S. PATENT DOCUMENTS

| | | | |
|---|---|---|---|
| 3,826,676 A | | 7/1974 | Heling et al. |
| 4,927,689 A | | 5/1990 | Markiewicz |
| 5,185,189 A | | 2/1993 | Stenger et al. |
| 5,324,572 A | * | 6/1994 | Kuechler et al. ............ 428/215 |
| 5,595,623 A | * | 1/1997 | Lulham et al. ......... 156/244.14 |
| 5,843,502 A | | 12/1998 | Ramesh |
| 6,177,159 B1 | * | 1/2001 | Tajiri et al. ................. 428/35.7 |
| 6,517,920 B1 | | 2/2003 | Schroder et al. |
| 6,541,087 B1 | | 4/2003 | Pophusen et al. |

FOREIGN PATENT DOCUMENTS

| | | |
|---|---|---|
| DE | 199 43 910 A1 | 3/2001 |
| DE | 697 15 425 T2 | 1/2003 |
| EP | 0 372 489 A2 | 6/1990 |
| EP | 0 467 039 A2 | 1/1992 |
| EP | 0 550 575 A1 | 9/1992 |
| EP | 1 018 424 A1 | 7/2000 |
| EP | 1 084 620 A2 | 3/2001 |
| WO | WO 96/16799 | 6/1996 |
| WO | WO 02/26494 A2 | 4/2002 |

* cited by examiner

*Primary Examiner*—Michael C Miggins
(74) *Attorney, Agent, or Firm*—Oliff & Berridge, PLC

(57) ABSTRACT

The present invention for the first time furnishes a multilayer planar or tubular food casing or film for food packagings such as, e.g., sausage casings, shrink bags or the like, which comprises a layered structure having at least five, preferably at least seven layers.

7 Claims, No Drawings

MULTILAYER PLANAR OR TUBULAR FOOD CASING OR FILM

The present invention relates to a multilayer planar or tubular food casing or film for food packagings such as, e.g., sausage casings, shrink bags or the like, in accordance with the preamble of Claim 1.

DE 32 12 343 A1 discloses a tubular casing of two-layer film laminate for packaging.

Furthermore a multilayer, tubular casing for packaging pasty stuffings, in particular an artificial sausage casing, on the basis of polyamide is discussed in DE 40 17 046 A1 as well as in EP 0 467 039 A2.

In practice, such sausage casings or artificial casings are utilized for packaging sausage or pasty matter. The product to be packaged, such as a sausage mass, is filled into the artificial casing, scalded in it, cooled, and stored. From this there arise demands such as, e.g., a distinct dimensional stability throughout the entire working process or a sufficient protection of the stuffing against external influences such as, e.g., penetration of oxygen, UV radiation, desiccation, or the like.

The classical sausage casings known in practice may roughly be classified into three types: The classical one-layer sausage casing of polyamide, having as an essential drawback the lack of a water vapor barrier. A widely used sausage casing of three layers containing, from the outside to the inside, polyamide, polyolefin, preferably polyethylene, polyamide. The water vapor barrier, which is lacking in the one-layer sausage casing, is formed by the central polyolefin layer. The inner layer of polyamide provides sufficient adhesion of stuffing and prevents precipitation or settling of jelly. This polyamide layer may also be replaced with a correspondingly pre-treated (corona) PE layer, in which case the PE layer then has to be modified in order to enter a satisfactory connection with the PA. In recent times, sausage casings having five layers have found acceptance in practice. The five layers, counted from the outside to the inside, contain PA, an adhesion promoter, PE, an adhesion promoter, and finally again PA. The approach of this structure corresponds to the one of the three-layer sausage casing, however has between PA and PE, and between PE and PA, a respective separate adhesive layer or a respective separate adhesion promoter. As a result the central polyolefin layer may be modified more strongly with regard to the starting materials used.

Irrespective of this, the oxygen barrier and also the aroma barrier thereby available are not yet formed with sufficient tightness.

It is accordingly an object of the present invention to further develop a generic multilayer planar or tubular food casing or film while avoiding the above mentioned disadvantages, such that a sufficiently tight oxygen barrier may be furnished concurrently with a satisfactory aroma barrier.

This object is achieved through the features of Claim 1.

In accordance with the invention a multilayer planar or tubular food casing or film for food packagings, such as, e.g., sausage casings, shrink bags etc., is being proposed, which is for the first time characterized by a layered structure having at least five, preferably at least seven layers, with one of the at least five layers containing PVA as a layer constituent.

For particularly preferred variants of the multilayer planar or tubular food casing or film for food packagings in accordance with the invention, the following layered structures, counted from the outside to the inside, are being proposed for the first time:

a) the first layer from the outside contains polyamide as a layer constituent, the second layer PVA, the third layer an adhesion promoter, the fourth layer a polyolefin, preferably polyethylene, the fifth layer an adhesion promoter, and the sixth layer from the outside, being at the same time the innermost layer or the layer facing the food to be packaged, a polyamide as a layer constituent, or b) the first layer from the outside contains polyamide as a layer constituent, the second layer PVA, the third layer polyamide, the fourth layer an adhesion promoter, the fifth layer a polyolefin, preferably polyethylene, the sixth layer an adhesion promoter, and the seventh layer from the outside, being at the same time the innermost layer or the layer facing the food to be packaged, a polyamide as a layer constituent, or c) the first layer from the outside contains polyamide as a layer constituent, the second layer an adhesion promoter, the third layer polyamide, the fourth layer PVA, the fifth layer polyamide, the sixth layer an adhesion promoter, and the seventh layer from the outside, being at the same time the innermost layer or the layer facing the food to be packaged, a polyamide as a layer constituent.

Furthermore particularly preferred variants of a multilayer planar or tubular food casing or film for food packagings in accordance with the invention are for the first time proposed which have a layered structure wherein, when counted from the outside to the inside:

a) the first layer from the outside contains as a layer constituent a polyolefin, preferably polyethylene, the second layer an adhesion promoter, the third layer polyamide, the fourth layer PVA, the fifth layer polyamide, the sixth layer an adhesion promoter, and the seventh layer from the outside, being at the same time the innermost layer, a polyolefin, preferably polyethylene, or b) the first layer from the outside contains as a layer constituent PET, the second layer an adhesion promoter, the third layer polyamide, the fourth layer PVA, the fifth layer polyamide, the sixth layer an adhesion promoter, and the seventh layer from the outside, being at the same time the innermost layer, a polyolefin, preferably polyethylene, or c) the first layer from the outside contains as a layer constituent a polyolefin, preferably polyethylene, the second layer EVA, the third layer an adhesion promoter, the fourth layer PVA, the fifth layer an adhesion promoter, the sixth layer EVA, and the seventh layer from the outside, being at the same time the innermost layer, a polyolefin, preferably polyethylene.

PVA advantageously results in the desired high oxygen barrier, with a simultaneously substantially enhanced aroma barrier. Furthermore a smoother and softer film is thereby achieved, which is substantially improved with a view to its suitability for further mechanical processing. PVA in this context designates polyvinyl alcohol which may also be abbreviated PVOH or PVAL. PVA is to designate both PVA and mixtures of PVA with other polymers.

The PA allows to ensure the desired mechanical properties. The PE provides the possibility of positively influencing sealing. With EVA, high shrink as well as a further possibility of influencing the mechanical properties are moreover obtained, in which case a supplementary electron beam treatment is to be provided.

The polyolefins encompass both PE and PP as well as EVA and EM(M)A within the meaning of the present application, as well as mixtures of polyolefins as such as well as with ionomers. The adhesion promoters (short: AP) represent an adhesive layer.

PA generally designates PA as well as PA 6, PA 66, PA 6/66, PA 6/12 or the like, and also mixtures of these, as well as mixtures of PA with other polymers. EVA furthermore designates both EVA and mixtures of EVA with polymers.

Thus a food casing or film for food packagings, in particular for sausage casings or the like is advantageously furnished, whereby a specific shrink of at least 10 to 20%, preferably of at least 12 to 15%, is readily possible.

Specifically in the case of shrink bags or the like, it is advantageously possible with the layered structures proposed for the first time, to achieve a particularly high shrink that is at least 20 to 60%, preferably at least 30 to 50%, at a water temperature of about 95° C.

The overelongation factor thus available at the same time is at least 5 to 15%, preferably 10 to 12% for both sausage casings and shrink bags.

For the sealing layers to be provided on the inside and/or outside of shrink bags, it is possible with the layered structures proposed for the first time to advantageously provide, e.g., a polyolefin, preferably PE, LLDPE, EVA, or ionomers or mixtures of these etc., as a starting material.

Thanks to the particularly strongly pronounced oxygen barrier obtained through the layer constituent PVA, excellent preservation of the foodstuff thereby packaged, in particular of a sausage mass placed in the sausage casing, is ensured over more than six weeks without any quality reduction.

Thanks to the extremely well formed oxygen barrier, the food casing or film of the invention for the first time provides a food packaging whereby even goods that are particularly sensitive to air do not undergo any color changes or even run a risk of aging or changing taste due to a penetration of oxygen, even with long storage periods.

Thus the layer constituent PVA is in a preferred layered structure embedded, in the manner of a sandwich, between two layers including polyamide as a layer constituent, which results in a highest possible oxygen barrier and at the same time ensures excellent embedding and stabilization of the PVA layer between the two polyamide layers as carrier layers.

At the same time a particularly excellent water vapor barrier is available with the layered structure of the invention, which is crucial particularly in the case of sausage or other foodstuffs that need to be kept fresh. Foods packaged with the food casing or film of the invention therefore remain fresh for a particularly long period of time.

Furthermore the food casing or film of the invention is suited as a shrink film and may moreover be sealed well during bonding. Where the food casing or film of the invention is used as a sausage casing, pure bonding is equally possible without any problems.

The outermost layer of the food casing or film proposed for the first time takes inscriptions or print particularly well.

In addition, the food casing or film of the invention is particularly well suited to be manufactured and further processed with corresponding systems of the present applicant.

Advantageous developments of the invention result from the features of the subclaims.

Thus it is provided in a preferred embodiment of the food casing or film for food packagings in accordance with the invention that layers including polypropylene or polyolefin as a layer constituent alternatively also contain polypropylene, EVA (ethyl vinyl alcohol), EM(M)A, ionomers, or mixtures of these etc.

Furthermore it is provided in a preferred embodiment that layers containing an adhesion promoter include an adhesion promoter on the basis of PE, EVA, EM(M)A or an ionomer as a base material.

In accordance with a further preferred embodiment it is provided that layers including an adhesion promoter as a constituent alternatively contain a mixture of polyolefin and adhesion promoter or a mixture of EVA and/or EM(M)A and adhesion promoter.

In accordance with a further preferred embodiment it is provided that layers including PVA as a layer constituent alternatively contain MXD6 (modified polyamide 6).

In accordance with a further preferred embodiment of the food casing or film of the invention it is provided that layers including polyamide as a layer constituent alternatively contain an ionomer.

Furthermore it is provided in accordance with a preferred embodiment that layers including polyamide as a layer constituent alternatively contain MXD6.

Not last it is provided in accordance with a preferred embodiment that layers including polyamide as a layer constituent contain polycaprolactame (PA 6), polyhexamethylene adipinamide (PA 66), PA 6/66, PA 11, PA 12 or mixtures of these polyamides etc.

By the present invention a planar or tubular food casing or film having a layered structure with at least five layers, preferably at least seven layers, is thus proposed for the first time.

The invention claimed is:

1. A multilayer tubular or film sausage casing, comprising:
    a layered structure having an inside and an outside and at least seven layers, wherein
    a first layer from the outside comprises polyamide as a layer constituent,
    a second layer from the outside comprises an adhesion promoter as a layer constituent,
    a third layer from the outside comprises polyamide as a layer constituent,
    a fourth layer from the outside comprises PVA as a layer constituent,
    a fifth layer from the outside comprises polyamide as a layer constituent,
    a sixth layer from the outside comprises an adhesion promoter as a layer constituent, and
    a seventh layer from the outside comprises polyamide as a layer constituent.

2. The multilayer planar or tubular sausage casing of claim 1, wherein the adhesion promoter comprises at least one material selected from the group consisting of PE, EVA, EM(M)A, and ionomer.

3. The multilayer planar or tubular sausage casing of claim 1, wherein layers including an adhesion promoter as a constituent further comprise a mixture of polyolefin and adhesion promoter or a mixture of EVA and/or EM(M)A and adhesion promoter.

4. The multilayer planar or tubular sausage casing of claim 1, wherein layers including PVA as a layer constituent further comprise MXD6 (modified polyamide 6).

5. The multilayer planar or tubular sausage casing of claim 1, wherein layers including polyamide as a layer constituent further comprise an ionomer.

6. The multilayer planar or tubular sausage casing of claim 1, wherein layers including polyamide as a layer constituent further comprise MXD6.

7. The multilayer planar or tubular sausage casing of claim 1, wherein layers including polyamide as a layer constituent further comprise at least one compound selected from the group consisting of polycaprolactame (PA 6), polyhexamethylene adipinamide (PA 66), PA 6/66, PA 11, and PA 12.

* * * * *